(12) United States Patent
Lanahan et al.

(10) Patent No.: US 10,706,222 B2
(45) Date of Patent: Jul. 7, 2020

(54) SYSTEM AND METHODS FOR MULTIMEDIA "HOT SPOT" ENABLEMENT

(71) Applicant: eBay Inc., San Jose, CA (US)

(72) Inventors: James W. Lanahan, Palo Alto, CA (US); Dane M. Howard, Los Gatos, CA (US); Brian F. Williams, San Carlos, CA (US); Luke Peacock, Fremont, CA (US); Belmer Perrella Garcia Negrillo, San Francisco, CA (US)

(73) Assignee: eBay Inc., San Jose, CA (US)

(*) Notice: Subject to any disclaimer, the term of this patent is extended or adjusted under 35 U.S.C. 154(b) by 120 days.

(21) Appl. No.: 15/583,704

(22) Filed: May 1, 2017

(65) Prior Publication Data

US 2017/0235712 A1    Aug. 17, 2017

Related U.S. Application Data

(63) Continuation of application No. 12/347,638, filed on Dec. 31, 2008, now Pat. No. 9,639,505.

(Continued)

(51) Int. Cl.
*G06F 40/169* (2020.01)
*G06F 16/43* (2019.01)
(Continued)

(52) U.S. Cl.
CPC .......... *G06F 40/169* (2020.01); *G06F 3/0482* (2013.01); *G06F 3/04817* (2013.01);
(Continued)

(58) Field of Classification Search
CPC .... G06F 17/211; G06F 17/241; G06F 17/212; G06F 17/2247; G06F 17/24;
(Continued)

(56) References Cited

U.S. PATENT DOCUMENTS

| 5,541,662 | A | 6/1996 | Adams |
| 5,539,871 | A | 7/1996 | Gibson |

(Continued)

FOREIGN PATENT DOCUMENTS

| JP | 2008-183330 | 8/2008 |
| WO | 2000/007110 | 2/2000 |

(Continued)

OTHER PUBLICATIONS

Janine C. Warner Dreamweaver CS3 for Dummies May 7, 2007 (Year: 2007).*

(Continued)

*Primary Examiner* — Andrea N Long
(74) *Attorney, Agent, or Firm* — SBMC

(57) ABSTRACT

A method for creating a multimedia presentation element, comprises selecting a presentation element icon; adding information to a presentation element box defined by a presentation boundary within a first multimedia element of the multi-media presentation having a plurality of multimedia elements, the presentation element boundary resulting from the selection of the presentation element icon; and associating the presentation element box with the first multimedia element such that the presentation element box remains associated to the first multimedia element during navigation from different multimedia elements of the plurality of multimedia elements, is described herein.

18 Claims, 9 Drawing Sheets

Related U.S. Application Data

(60) Provisional application No. 61/078,288, filed on Jul. 3, 2008.

(51) Int. Cl.

| | | |
|---|---|---|
| *G06F 16/44* | (2019.01) | |
| *G06F 16/28* | (2019.01) | |
| *G06F 16/435* | (2019.01) | |
| *G06F 16/438* | (2019.01) | |
| *G06F 16/242* | (2019.01) | |
| *G06F 16/33* | (2019.01) | |
| *G06F 16/9535* | (2019.01) | |
| *G06F 16/957* | (2019.01) | |
| *G06T 11/60* | (2006.01) | |
| *G06F 40/14* | (2020.01) | |
| *G06F 40/103* | (2020.01) | |
| *G06F 40/106* | (2020.01) | |
| *G06F 40/166* | (2020.01) | |
| *G06F 3/0482* | (2013.01) | |
| *G06F 3/0481* | (2013.01) | |
| *G06Q 30/02* | (2012.01) | |

(52) U.S. Cl.
CPC ........ *G06F 16/2428* (2019.01); *G06F 16/285* (2019.01); *G06F 16/3344* (2019.01); *G06F 16/43* (2019.01); *G06F 16/435* (2019.01); *G06F 16/438* (2019.01); *G06F 16/44* (2019.01); *G06F 16/9535* (2019.01); *G06F 16/9577* (2019.01); *G06F 40/103* (2020.01); *G06F 40/106* (2020.01); *G06F 40/14* (2020.01); *G06F 40/166* (2020.01); *G06T 11/60* (2013.01); *G06Q 30/02* (2013.01); *G06T 2200/24* (2013.01)

(58) Field of Classification Search
CPC .............. G06F 3/04817; G06F 3/0482; G06F 16/2428; G06F 16/285; G06F 16/3344; G06F 16/43; G06F 16/435; G06F 16/438; G06F 16/44; G06F 16/9535; G06F 16/9577; G06F 17/30011; G06F 17/30023; G06F 17/30029; G06F 17/3005; G06F 17/30056; G06F 17/30058; G06F 17/30398; G06F 17/30598; G06F 17/30684; G06F 17/30867; G06F 17/30905; G06F 3/0481; G06F 3/0483; G06F 3/04842; G06Q 30/02; G06T 11/60; G06T 2200/24; H04L 67/02
See application file for complete search history.

(56) References Cited

U.S. PATENT DOCUMENTS

| | | | |
|---|---|---|---|
| 5,559,942 A | 9/1996 | Gough et al. | |
| 5,578,808 A | 11/1996 | Taylor | |
| 5,666,554 A | 9/1997 | Tanaka | |
| 5,708,845 A | 1/1998 | Wistendahl et al. | |
| 5,844,557 A | 12/1998 | Shively, II | |
| 5,860,073 A | 1/1999 | Ferrel | |
| 5,918,012 A | 6/1999 | Astiz et al. | |
| 5,933,817 A | 8/1999 | Hucal | |
| 6,008,807 A | 12/1999 | Bretschneider et al. | |
| 6,038,552 A | 3/2000 | Fleischi et al. | |
| 6,097,389 A | 8/2000 | Morris et al. | |
| 6,259,457 B1 | 7/2001 | Davies | |
| 6,397,196 B1 | 5/2002 | Kravetz et al. | |
| 6,470,100 B2 | 10/2002 | Horiuschi | |
| 6,515,656 B1 * | 2/2003 | Wittenburg ........... G06F 3/0485 345/418 | |
| 6,647,383 B1 | 11/2003 | August et al. | |
| 6,751,776 B1 | 6/2004 | Gong | |
| 6,769,095 B1 | 7/2004 | Brassard | |
| 6,834,282 B1 | 12/2004 | Bonneau | |
| 7,023,452 B2 | 4/2006 | Oshiyama et al. | |
| 7,181,468 B2 | 2/2007 | Spring et al. | |
| 7,237,185 B1 | 6/2007 | Sequeira | |
| 7,276,290 B2 | 10/2007 | Anderson et al. | |
| 7,296,242 B2 | 11/2007 | Agata et al. | |
| 7,376,290 B2 | 5/2008 | Anderson et al. | |
| 7,469,380 B2 | 12/2008 | Wessling et al. | |
| 7,502,795 B1 | 3/2009 | Svendsen et al. | |
| 7,546,554 B2 | 6/2009 | Chiu et al. | |
| 7,573,486 B2 | 8/2009 | Mondry | |
| 7,576,555 B2 | 8/2009 | Hashimoto | |
| 7,576,755 B2 | 8/2009 | Sun et al. | |
| RE41,210 E | 4/2010 | Wang | |
| 7,725,494 B2 | 5/2010 | Rogers et al. | |
| 7,752,548 B2 | 7/2010 | Mercer | |
| 7,768,535 B2 | 8/2010 | Reid et al. | |
| 7,805,382 B2 | 9/2010 | Rosen et al. | |
| 7,814,560 B2 | 10/2010 | Bellagamba et al. | |
| 7,836,110 B1 | 11/2010 | Schoenbach et al. | |
| 7,885,951 B1 * | 2/2011 | Rothschild ........... G06F 16/434 707/709 | |
| 7,885,955 B2 * | 2/2011 | Hull ................... G06K 9/00442 707/722 | |
| 7,982,909 B2 | 7/2011 | Beato | |
| 8,006,192 B1 | 8/2011 | Reid et al. | |
| 8,010,629 B2 | 8/2011 | Williams et al. | |
| 8,024,658 B1 | 9/2011 | Fagans et al. | |
| 8,082,328 B2 | 12/2011 | Hull et al. | |
| 8,103,546 B1 | 1/2012 | De Jardins | |
| 8,121,902 B1 | 2/2012 | Desjardins | |
| 8,316,084 B2 | 11/2012 | Lanahan et al. | |
| 8,365,092 B2 | 1/2013 | Lanahan et al. | |
| 8,560,565 B2 | 10/2013 | Howard et al. | |
| 8,620,893 B2 | 12/2013 | Howard et al. | |
| 8,627,192 B2 | 1/2014 | Lanahan et al. | |
| 8,667,160 B1 | 3/2014 | Haot et al. | |
| 8,789,094 B1 | 7/2014 | Singh | |
| 8,799,952 B2 | 8/2014 | Gossweiler | |
| 8,812,945 B2 | 8/2014 | Sidon | |
| 8,893,015 B2 | 11/2014 | Lanahan et al. | |
| 9,043,726 B2 | 5/2015 | Lanahan et al. | |
| 9,430,448 B2 | 8/2016 | Howard et al. | |
| 9,613,006 B2 | 4/2017 | Lanahan et al. | |
| 9,639,505 B2 | 5/2017 | Lanahan et al. | |
| 9,658,754 B2 | 5/2017 | Lanahan et al. | |
| 10,157,170 B2 | 12/2018 | Howard et al. | |
| 10,282,391 B2 | 5/2019 | Lanahan et al. | |
| 2001/0034740 A1 | 10/2001 | Kerne | |
| 2001/0044825 A1 | 11/2001 | Barritz | |
| 2001/0044835 A1 | 11/2001 | Schnober | |
| 2001/0050681 A1 | 12/2001 | Keys et al. | |
| 2002/0023111 A1 * | 2/2002 | Arora .................... G06F 17/218 715/234 | |
| 2002/0080165 A1 * | 6/2002 | Wakefield .............. G06Q 30/02 715/738 | |
| 2002/0083178 A1 | 6/2002 | Brothers | |
| 2002/0091600 A1 | 7/2002 | Kravetz et al. | |
| 2002/0108122 A1 | 8/2002 | Alao et al. | |
| 2002/0112093 A1 | 8/2002 | Slotznick | |
| 2002/0135621 A1 | 9/2002 | Angiulo et al. | |
| 2002/0138428 A1 | 9/2002 | Spear | |
| 2002/0152233 A1 | 10/2002 | Cheong et al. | |
| 2002/0164151 A1 | 11/2002 | Jasinschi | |
| 2002/0180803 A1 | 12/2002 | Kaplan | |
| 2003/0046222 A1 | 3/2003 | Bard et al. | |
| 2003/0098877 A1 | 5/2003 | Boegelund | |
| 2003/0149983 A1 | 8/2003 | Markel | |
| 2004/0008226 A1 | 1/2004 | Manolis et al. | |
| 2004/0054579 A1 | 3/2004 | Lamb et al. | |
| 2004/0083080 A1 | 4/2004 | Reghetti et al. | |
| 2004/0091232 A1 | 5/2004 | Appling, III | |
| 2004/0143796 A1 | 7/2004 | Lerner et al. | |
| 2004/0184778 A1 | 9/2004 | Jung et al. | |
| 2004/0199574 A1 | 10/2004 | Franco et al. | |
| 2004/0001106 A1 | 12/2004 | Deutscher et al. | |

(56) References Cited

U.S. PATENT DOCUMENTS

| | | |
|---|---|---|
| 2004/0268224 A1 | 12/2004 | Balkus et al. |
| 2005/0094014 A1 | 5/2005 | Haas et al. |
| 2005/0114356 A1 | 5/2005 | Bhatti |
| 2005/0114754 A1 | 5/2005 | Miller et al. |
| 2005/0114784 A1 | 5/2005 | Spring et al. |
| 2005/0138193 A1 | 6/2005 | Encarnacion et al. |
| 2005/0149970 A1 | 7/2005 | Fairhurst et al. |
| 2005/0228749 A1 | 10/2005 | Lozano |
| 2005/0234981 A1 | 10/2005 | Manousos et al. |
| 2005/0237952 A1 | 10/2005 | Punj |
| 2005/0268227 A1 | 12/2005 | Carlson |
| 2005/0268279 A1 | 12/2005 | Paulsen et al. |
| 2005/0273693 A1 | 12/2005 | Peterson |
| 2006/0010162 A1 | 1/2006 | Stevens |
| 2006/0036949 A1 | 2/2006 | Moore et al. |
| 2006/0061595 A1 | 3/2006 | Goede et al. |
| 2006/0064642 A1 | 3/2006 | Iyer |
| 2006/0069989 A1 | 3/2006 | Jones |
| 2006/0070005 A1 | 3/2006 | Gilbert et al. |
| 2006/0086843 A1 | 4/2006 | Lin et al. |
| 2006/0089843 A1 | 4/2006 | Flather |
| 2006/0106693 A1 | 5/2006 | Carlson et al. |
| 2006/0112081 A1 | 5/2006 | Qureshi |
| 2006/0114510 A1 | 6/2006 | Maeng |
| 2006/0123455 A1 | 6/2006 | Pai et al. |
| 2006/0129917 A1 | 6/2006 | Volk et al. |
| 2006/0181736 A1 | 8/2006 | Quek et al. |
| 2006/0184574 A1 | 8/2006 | Wu et al. |
| 2006/0193008 A1 | 8/2006 | Osaka |
| 2006/0195789 A1 | 8/2006 | Rogers et al. |
| 2006/0203294 A1 | 9/2006 | Makino |
| 2006/0206811 A1 | 9/2006 | Dowdy |
| 2006/0230332 A1 | 10/2006 | Lin |
| 2006/0256739 A1 | 11/2006 | Seier et al. |
| 2006/0271691 A1 | 11/2006 | Jacobs et al. |
| 2006/0277482 A1 | 12/2006 | Hoffman et al. |
| 2006/0287989 A1 | 12/2006 | Glance |
| 2007/0016930 A1 | 1/2007 | Wesemann |
| 2007/0033059 A1 | 2/2007 | Adkins |
| 2007/0038931 A1 | 2/2007 | Allaire |
| 2007/0050718 A1 | 3/2007 | Moore et al. |
| 2007/0061266 A1 | 3/2007 | Moore |
| 2007/0061715 A1 | 3/2007 | Chartier et al. |
| 2007/0070066 A1 | 3/2007 | Bakhash |
| 2007/0074110 A1 | 3/2007 | Miksovsky et al. |
| 2007/0078989 A1 | 4/2007 | Van Datta et al. |
| 2007/0089057 A1 | 4/2007 | Kindig |
| 2007/0113250 A1 | 5/2007 | Logan et al. |
| 2007/0118801 A1 | 5/2007 | Harshbarger et al. |
| 2007/0130177 A1 | 6/2007 | Schneider et al. |
| 2007/0136194 A1 | 6/2007 | Sloan |
| 2007/0136244 A1 | 6/2007 | Maclaurin et al. |
| 2007/0156382 A1 | 7/2007 | Graham |
| 2007/0156434 A1 | 7/2007 | Martin et al. |
| 2007/0162853 A1 | 7/2007 | Weber et al. |
| 2007/0162856 A1 | 7/2007 | Schlossberg |
| 2007/0186182 A1 | 8/2007 | Schiller |
| 2007/0204208 A1 | 8/2007 | Cheng et al. |
| 2007/0204209 A1 | 8/2007 | Truelove et al. |
| 2007/0239770 A1 | 10/2007 | Enock et al. |
| 2007/0245243 A1* | 10/2007 | Lanza ............... G06Q 30/0277 715/723 |
| 2007/0253028 A1 | 11/2007 | Widdowson |
| 2007/0262995 A1 | 11/2007 | Tran |
| 2008/0021829 A1 | 1/2008 | Kranzley |
| 2008/0027798 A1 | 1/2008 | Ramamurthi et al. |
| 2008/0034295 A1 | 2/2008 | Kulas |
| 2008/0040683 A1* | 2/2008 | Walsh ................. G06F 3/04855 715/786 |
| 2008/0046406 A1 | 2/2008 | Seide et al. |
| 2008/0077530 A1 | 3/2008 | Banas |
| 2008/0081662 A1* | 4/2008 | Strandell ......... H04M 1/274516 455/557 |
| 2008/0086688 A1 | 4/2008 | Chandratillake |
| 2008/0086689 A1 | 4/2008 | Berkley et al. |
| 2008/0092054 A1 | 4/2008 | Bhumkar et al. |
| 2008/0120278 A1 | 5/2008 | Roe et al. |
| 2008/0126191 A1 | 5/2008 | Schiavi |
| 2008/0134018 A1 | 6/2008 | Kembel et al. |
| 2008/0165960 A1 | 7/2008 | Woo |
| 2008/0195477 A1 | 8/2008 | Kennedy |
| 2008/0195962 A1 | 8/2008 | Lin et al. |
| 2008/0205694 A1 | 8/2008 | Sagoo et al. |
| 2008/0215680 A1 | 9/2008 | Salesky et al. |
| 2008/0215985 A1 | 9/2008 | Batchelder et al. |
| 2008/0222560 A1 | 9/2008 | Harrison |
| 2008/0270905 A1 | 10/2008 | Goldman |
| 2008/0276279 A1 | 11/2008 | Gossweiler et al. |
| 2008/0288460 A1 | 11/2008 | Poniatowski et al. |
| 2008/0301546 A1 | 12/2008 | Moore et al. |
| 2008/0306995 A1 | 12/2008 | Newell et al. |
| 2009/0007023 A1* | 1/2009 | Sundstrom ............ G06F 3/0481 715/858 |
| 2009/0083161 A1* | 3/2009 | Mital .................. G06Q 30/0601 705/26.1 |
| 2009/0087161 A1 | 4/2009 | Roberts et al. |
| 2009/0119256 A1 | 5/2009 | Waters |
| 2009/0132415 A1 | 5/2009 | Davis et al. |
| 2009/0177546 A1 | 7/2009 | Dijk et al. |
| 2009/0210391 A1 | 8/2009 | Hall et al. |
| 2009/0254515 A1 | 10/2009 | Terheggen et al. |
| 2009/0271283 A1 | 10/2009 | Fosnacht et al. |
| 2009/0276425 A1 | 11/2009 | Phillips et al. |
| 2009/0292681 A1 | 11/2009 | Wood et al. |
| 2009/0319530 A1 | 12/2009 | Hoertnagl |
| 2010/0005066 A1 | 1/2010 | Howard et al. |
| 2010/0005067 A1 | 1/2010 | Howard et al. |
| 2010/0005068 A1 | 1/2010 | Howard et al. |
| 2010/0005119 A1 | 1/2010 | Howard et al. |
| 2010/0005139 A1 | 1/2010 | Lanahan et al. |
| 2010/0005379 A1 | 1/2010 | Lanahan et al. |
| 2010/0005380 A1 | 1/2010 | Lanahan et al. |
| 2010/0005397 A1 | 1/2010 | Lanahan et al. |
| 2010/0005408 A1 | 1/2010 | Lanahan et al. |
| 2010/0005417 A1 | 1/2010 | Lanahan et al. |
| 2010/0005498 A1 | 1/2010 | Lanaha |
| 2010/0023849 A1 | 1/2010 | Hakim et al. |
| 2010/0036812 A1 | 2/2010 | Choi et al. |
| 2010/0042628 A1 | 2/2010 | Crowley et al. |
| 2010/0083077 A1 | 4/2010 | Paulsen et al. |
| 2010/0083303 A1 | 4/2010 | Redei et al. |
| 2010/0115410 A1 | 5/2010 | Fu et al. |
| 2010/0162375 A1 | 6/2010 | Tiu |
| 2010/0281386 A1 | 11/2010 | Lyons et al. |
| 2010/0332565 A1 | 12/2010 | Al-Shaykh et al. |
| 2011/0022966 A1 | 1/2011 | Rose |
| 2011/0060979 A1 | 3/2011 | O'Brien-Strain |
| 2011/0285748 A1 | 11/2011 | Slatter et al. |
| 2012/0323743 A1 | 12/2012 | Chang et al. |
| 2014/0108931 A1 | 4/2014 | Howard et al. |
| 2014/0122985 A1 | 5/2014 | Lanahan et al. |
| 2015/0074502 A1 | 3/2015 | Lanahan et al. |
| 2015/0254212 A1 | 9/2015 | Lanahan et al. |
| 2016/0371266 A1 | 12/2016 | Howard et al. |
| 2017/0199847 A1 | 7/2017 | Lanahan et al. |
| 2017/0235450 A1 | 8/2017 | Lanahan et al. |
| 2018/0329870 A1 | 11/2018 | Lanahan et al. |
| 2019/0339830 A1 | 11/2019 | Lanahan et al. |

FOREIGN PATENT DOCUMENTS

| | | |
|---|---|---|
| WO | 2000/056055 | 9/2000 |
| WO | 2002/059799 A1 | 8/2002 |
| WO | 2010/003111 A1 | 1/2010 |
| WO | 2010/003121 A1 | 1/2010 |

OTHER PUBLICATIONS

U.S. Appl. No. 14/722,030, Amendment and Response filed Sep. 19, 2017, 18 pages.

U.S. Appl. No. 14/722,030, Notice of Allowance dated Oct. 19, 2017, 9 pages.

(56) References Cited

OTHER PUBLICATIONS

U.S. Appl. No. 15/250,763, Office Action dated Aug. 31, 2017, 14 pages.
Retrieved from the Internet URL: <https://web.archive.org/web/20090731120449/http://blog.justswell.org/drag-and-drop-files-from-your-desktop-to-your-browser-using-javascript/>, Jul. 28, 2009, 5 pages.
Final Office Action received for U.S. Appl. No. 12/347,747, dated Jul. 12, 2018, 11 pages.
Examiner-Initiated Interview Summary received for U.S. Appl. No. 14/144,199, dated Aug. 7, 2018, 1 page.
Notice of Allowance received for U.S. Appl. No. 14/144,199, dated Aug. 7, 2018, 8 pages.
Notice of Allowance received for U.S. Appl. No. 14/722,030, dated Jun. 11, 2018, 7 pages.
Advisory Action received for U.S. Appl. No. 15/250,763, dated Jul. 5, 2018, 3 pages.
Final Office Action received for U.S. Appl. No. 15/452,474, dated Jul. 16, 2018, 16 pages.
Communication Pursuant to Article 94(3) EPC received for European Patent Application No. 09774560.8, dated Nov. 10, 2014, 7 pages.
Extended European Search report received for European Patent Application No. 09774560.8, dated Jun. 26, 2013, 6 pages.
Response to Communication Pursuant to Article 94(3) EPC filed on Mar. 20, 2015, for European Patent Application No. 09774560.8, dated Nov. 10, 2014, 2 pages.
Response to Extended European Search report filed on Jan. 9, 2014, for European Patent Application No. 09774560.8, dated Jun. 26, 2013, 12 pages.
Communication Pursuant to Article 94(3) EPC received for European Patent Application No. 09774570.7, dated Sep. 16, 2013, 5 pages.
Response to Communication pursuant to Rules 94(3) EPC filed on Jan. 27, 2014, for European Patent Application No. 09774570.7, dated Sep. 16, 2013, 10 pages.
Summons to Attend Oral Proceedings received for European Patent Application No. 09774570.7, dated Oct. 14, 2015, 7 pages.
Extended European Search report received for European Patent Application No. 09774570.7, dated Nov. 22, 2011, 8 pages.
Applicant Initiated Interview Summary received for U.S. Appl. No. 12/347,747 dated Apr. 3, 2018, 3 pages.
Response to Non-Final Office Action filed on Mar. 28, 2018, for U.S. Appl. No. 12/347,747, dated Dec. 29, 2017, 17 pages.
Applicant Initiated Interview Summary Received for U.S. Appl. No. 14/144,199 dated Apr. 4, 2018, 3 pages.
Non-Final Office Action received for U.S. Appl. No. 14/144,199, dated Mar. 14, 2018, 8 pages.
Response to Non-Final Office Action filed on Apr. 5, 2018, for U.S. Appl. No. 14/144,199, dated Mar. 14, 2018, 20 pages.
Notice of Allowance received for U.S. Appl. No. 14/722,030, dated Feb. 27, 2018, 7 pages.
Response to Notice of Allowance filed on Jan. 19, 2018 for U.S. Appl. No. 14/722,030, dated Oct. 19, 2017, 7 pages.
Applicant Initiated Interview Summary Received for U.S. Appl. No. 15/250,763 dated Apr. 16, 2018, 3 pages.
Applicant Initiated Interview Summary received for U.S. Appl. No. 15/250,763 dated Dec. 4, 2017, 3 pages.
Final Office Action received for U.S. Appl. No. 15/250,763, dated Mar. 27, 2018, 12 pages.
Non-Final Office Action received for U.S. Appl. No. 15/452,474, dated Feb. 6, 2018, 13 pages.
Preliminary Amendment filed for U.S. Appl. No. 15/452,474, dated Jul. 5, 2017, 7 pages.
Preliminary Amendment filed for U.S. Appl. No. 15/584,993, dated May 2, 2017, 7 pages.
Response to Non-Final Office Action filed on May 4, 2018, for U.S. Appl. No. 15/452,474, dated Feb. 6, 2018, 10 pages.
Response to Final Office Action filed on May 29, 2018, for U.S. Appl. No. 15/250,763, dated Mar. 27, 2018, 18 pages.
U.S. Appl. No. 14/144,199, Notice of Allowance dated Nov. 17, 2017, 8 pages.
U.S. Appl. No. 15/250,763, Amendment and Response filed Nov. 30, 2017, 9 pages.
U.S. Appl. No. 12/347,747, Office Action dated Dec. 29, 2017, 17 pages.
Applicant-Initiated Interview Summary received for U.S. Appl. No. 15/250,763, dated Oct. 2, 2018, 4 pages.
Non-Final Office Action received for U.S. Appl. No. 15/250,763, dated Sep. 20, 2018, 12 pages.
Preliminary Amendment filed for U.S. Appl. No. 15/250,763, dated Sep. 6, 2016, 8 pages.
Corrected Notice of Allowability received for U.S. Appl. No. 14/144,199, dated Sep. 14, 2018, 3 pages.
Asterpix—SearchLight: Content Discovery Made Easy, http://www.asterpix.com/searchlightl, Feb. 14, 2011, 1 page.
Dorothy Burke, "How to use Lotus Notes 6", Mar. 4, 2003, 4 pages.
eBay the Chatter Check out the eBay to Go Widget, May 17, 2007, 3 pages.
eHow How to Create a clickable image map with Dreamweaver, Feb. 16, 2008, 2 pages.
Formatting Shapes and Objects, www.functionx.com/powerpoint/Lesson11.htm, Dec. 14, 2007, 8 pages.
Golden Nugget Screenshots, media.psx.ign.com/media/000/000295/imgs_1.html, Apr. 4, 2011, 2 pages.
Golden Nugget, www.absolute-playstation.com/api_review/rgnugg.htm, Apr. 4, 2011, 5 pages.
Google Operating System, Upload Files in a Browser Using Drag and Drop, http://googlesystems.blogspot.com/2007/02/upload-files-in-browser-using-drag-and.html, Feb. 23, 2007, 1 page.
Guns Hansen's Exclusive Poker Tips Video #1, www.dailymotion.com/video/x3op2y_gus-hansens-exclusive-poker-tips-vi_videogames, Dec. 6, 2007, 2 pages.
Josh Lowensohn, CNET eBay does MySpace-compatible widgets, May 1, 2007, 3 pages.
Looks Good Works Well by Bill Scotts, Musings on Rich Web Design and User Interface Engineering, http://looksgoodworkswell.golgspot.com/2006/03/maind-hacking-visual-transi_11437691330, Apr. 4, 2011, 7 pages.
Michael Arrington, eBay Launches "togo" Widgets for any listing, Apr. 30, 2007, 2 pages.
Microsoft FrontPage 2003 Image Maps: Creating Hotspots, Sep. 29, 2004, 5 pages.
Naj My Depictions Ebay to Go—New Widget to Display Listing, May 22, 2007, 3 pages.
PCT International Preliminary Report on Patentability in PCT/US2009/049606, dated Jan. 5, 2011, 5 pages.
PCT International Preliminary Report on Patentability in PCT/US2009/49622, dated Jan. 5, 2011, 5 pages.
PCT International Search Report and Written Opinion in PCT/US2009/049606, dated Aug. 14, 2009, 6 pages.
PCT International Search Report and Written Opinion in PCT/US2009/49622, dated Aug. 14, 2009, 6 pages.
Shelly Brisbin, "Clickable Image Maps in Adobe GoLive", Mar. 30, 2001, 3 pages.
U.S. Appl. No. 12/347,638, Advisory Action dated Dec. 7, 2016, 3 pages.
U.S. Appl. No. 12/347,638, Amendment and Response filed Dec. 5, 2011, 10 pages.
U.S. Appl. No. 12/347,638, Amendment and Response filed Jul. 11, 2012, 11 pages.
U.S. Appl. No. 12/347,638, Amendment and Response filed Jan. 24, 2013, 11 pages.
U.S. Appl. No. 12/347,638, Amendment and Response filed Aug. 20, 2013, 11 pages.
U.S. Appl. No. 12/347,638, Amendment and Response filed Jan. 3, 2014, 12 pages.
U.S. Appl. No. 12/347,638, Amendment and Response filed Jul. 25, 2014, 14 pages.
U.S. Appl. No. 12/347,638, Amendment and Response filed Apr. 29, 2015, 12 pages.
U.S. Appl. No. 12/347,638, Amendment and Response filed Nov. 17, 2015, 11 pages.

(56) References Cited

OTHER PUBLICATIONS

U.S. Appl. No. 12/347,638, Amendment and Response filed Jun. 21, 2016, 11 pages.
U.S. Appl. No. 12/347,638, Amendment and Response filed Nov. 28, 2016, 13 pages.
U.S. Appl. No. 12/347,638, Notice of Allowance dated Dec. 30, 2016, 5 pages.
U.S. Appl. No. 12/347,638, Office Action dated Sep. 8, 2011, 10 pages.
U.S. Appl. No. 12/347,638, Office Action dated Apr. 19, 2012, 11 pages.
U.S. Appl. No. 12/347,638, Office Action dated Oct. 26, 2012, 12 pages.
U.S. Appl. No. 12/347,638, Office Action dated May 21, 2013, 11 pages.
U.S. Appl. No. 12/347,638, Office Action dated Oct. 4, 2013, 12 pages.
U.S. Appl. No. 12/347,638, Office Action dated Apr. 25, 2014, 12 pages.
U.S. Appl. No. 12/347,638, Office Action dated Feb. 10, 2015, 15 pages.
U.S. Appl. No. 12/347,638, Office Action dated Aug. 17, 2015, 15 pages.
U.S. Appl. No. 12/347,638, Office Action dated Jan. 15, 2016, 16 pages.
U.S. Appl. No. 12/347,638, Office Action dated Sep. 26, 2016, 15 pages.
U.S. Appl. No. 12/347,747, Amendment and Response filed Apr. 20, 2011, 11 pages.
U.S. Appl. No. 12/347,747, Amendment and Response filed Oct. 5, 2011, 16 pages.
U.S. Appl. No. 12/347,747, Amendment and Response filed Apr. 23, 2012, 11 pages.
U.S. Appl. No. 12/347,747, Amendment and Response filed Oct. 8, 2014, 13 pages.
U.S. Appl. No. 12/347,747, Amendment and Response filed May 4, 2015, 15 pages.
U.S. Appl. No. 12/347,747, Amendment and Response filed Feb. 18, 2016, 14 pages.
U.S. Appl. No. 12/347,747, Amendment and Response filed Jun. 30, 2016, 13 pages.
U.S. Appl. No. 12/347,747, Amendment and Response filed Dec. 2, 2016, 10 pages.
U.S. Appl. No. 12/347,747, Amendment and Response filed May 10, 2017, 11 pages.
U.S. Appl. No. 12/347,747, Office Action dated Jan. 24, 2011, 9 pages.
U.S. Appl. No. 12/347,747, Office Action dated Jul. 7, 2011, 8 pages.
U.S. Appl. No. 12/347,747, Office Action dated Jan. 25, 2012, 14 pages.
U.S. Appl. No. 12/347,747, Office Action dated Jul. 8, 2014, 9 pages.
U.S. Appl. No. 12/347,747, Office Action dated Feb. 2, 2015, 10 pages.
U.S. Appl. No. 12/347,747, Office Action dated Nov. 18, 2015, 11 pages.
U.S. Appl. No. 12/347,747, Office Action dated Mar. 31, 2016, 13 pages.
U.S. Appl. No. 12/347,747, Office Action dated Sep. 2, 2016, 15 pages.
U.S. Appl. No. 12/347,747, Office Action dated Mar. 10, 2017, 14 pages.
U.S. Appl. No. 12/347,749, Amendment and Response filed Jun. 22, 2011, 9 pages.
U.S. Appl. No. 12/347,749, Amendment and Response filed Dec. 2, 2011, 9 pages.
U.S. Appl. No. 12/347,749, Amendment and Response filed Mar. 23, 2012, 10 pages.
U.S. Appl. No. 12/347,749, Amendment and Response filed Oct. 4, 2012, 13 pages.
U.S. Appl. No. 12/347,749, Amendment and Response filed May 7, 2013, 13 pages.
U.S. Appl. No. 12/347,749, Notice of Allowance dated Aug. 28, 2013, 11 pages.
U.S. Appl. No. 12/347,749, Office Action dated Mar. 24, 2011, 8 pages.
U.S. Appl. No. 12/347,749, Office Action dated Sep. 2, 2011, 7 pages.
U.S. Appl. No. 12/347,749, Office Action dated Dec. 23, 2011, 9 pages.
U.S. Appl. No. 12/347,749, Office Action dated Jul. 17, 2012, 10 pages.
U.S. Appl. No. 12/347,749, Office Action dated Feb. 13, 2013, 13 pages.
U.S. Appl. No. 12/347,829, Amendment and Response filed Dec. 29, 2011, 13 pages.
U.S. Appl. No. 12/347,829, Amendment and Response filed Sep. 12, 2012, 13 pages.
U.S. Appl. No. 12/347,829, Notice of Allowance dated Sep. 27, 2012, 8 pages.
U.S. Appl. No. 12/347,829, Office Action dated Oct. 5, 2011, 12 pages.
U.S. Appl. No. 12/347,829, Office Action dated Jun. 14, 2012, 12 pages.
U.S. Appl. No. 12/495,438, Amendment and Response filed Sep. 20, 2011, 11 pages.
U.S. Appl. No. 12/495,438, Amendment and Response filed Feb. 10, 2012, 12 pages.
U.S. Appl. No. 12/495,438, Amendment and Response filed Sep. 21, 2012, 12 pages.
U.S. Appl. No. 12/495,438, Amendment and Response filed Apr. 3, 2013, 12 pages.
U.S. Appl. No. 12/495,438, Notice of Allowance dated Jun. 11, 2013, 16 pages.
U.S. Appl. No. 12/495,438, Office Action dated Jun. 20, 2011, 15 pages.
U.S. Appl. No. 12/495,438, Office Action dated Nov. 21, 2011, 15 pages.
U.S. Appl. No. 12/495,438, Office Action dated Jun. 21, 2012, 13 pages.
U.S. Appl. No. 12/495,438, Office Action dated Jan. 3, 2013, 15 pages.
U.S. Appl. No. 12/495,493, Amendment and Response filed Nov. 1, 2011, 11 pages.
U.S. Appl. No. 12/495,493, Amendment and Response filed Mar. 23, 2012, 10 pages.
U.S. Appl. No. 12/495,493, Notice of Allowance dated Aug. 26, 2013, 12 pages.
U.S. Appl. No. 12/495,493, Office Action dated Aug. 2, 2011, 18 pages.
U.S. Appl. No. 12/495,493, Office Action dated Dec. 28, 2011, 18 pages.
U.S. Appl. No. 12/495,520, Amendment and Response filed Jun. 1, 2011, 9 pages.
U.S. Appl. No. 12/495,520, Amendment and Response filed Jan. 11, 2012, 12 pages.
U.S. Appl. No. 12/495,520, Amendment and Response filed Jan. 22, 2013, 12 pages.
U.S. Appl. No. 12/495,520, Amendment and Response filed Jul. 1, 2013, 13 pages.
U.S. Appl. No. 12/495,520, Amendment and Response filed Oct. 22, 2013, 14 pages.
U.S. Appl. No. 12/495,520, Amendment and Response filed Apr. 16, 2014, 18 pages.
U.S. Appl. No. 12/495,520, Amendment and Response filed Jul. 22, 2014, 18 pages.
U.S. Appl. No. 12/495,520, Amendment and Response filed Dec. 16, 2014, 15 pages.
U.S. Appl. No. 12/495,520, Amendment and Response filed Dec. 10, 2015, 20 pages.

(56) References Cited

OTHER PUBLICATIONS

U.S. Appl. No. 12/495,520, Notice of Allowance dated Apr. 25, 2016, 8 pages.
U.S. Appl. No. 12/495,520, Office Action dated Mar. 3, 2011, 22 pages.
U.S. Appl. No. 12/495,520, Office Action dated Oct. 18, 2011, 29 pages.
U.S. Appl. No. 12/495,520, Office Action dated Oct. 24, 2012, 31 pages.
U.S. Appl. No. 12/495,520, Office Action dated Apr. 2, 2013, 33 pages.
U.S. Appl. No. 12/495,520, Office Action dated Jul. 22, 2013, 34 pages.
U.S. Appl. No. 12/495,520, Office Action dated Jan. 16, 2014, 34 pages.
U.S. Appl. No. 12/495,520, Office Action dated Apr. 22, 2014, 35 pages.
U.S. Appl. No. 12/495,520, Office Action dated Sep. 16, 2014, 34 pages.
U.S. Appl. No. 12/495,520, Office Action dated Sep. 10, 2015, 39 pages.
U.S. Appl. No. 12/495,684, Amendment and Response filed Feb. 8, 2012, 11 pages.
U.S. Appl. No. 12/495,684, Amendment and Response filed Jul. 6, 2012, 10 pages.
U.S. Appl. No. 12/495,684, Amendment and Response filed Feb. 28, 2014, 11 pages.
U.S. Appl. No. 12/495,684, Notice of Allowance dated Jul. 7, 2014, 15 pages.
U.S. Appl. No. 12/495,684, Office Action dated Nov. 15, 2011, 12 pages.
U.S. Appl. No. 12/495,684, Office Action dated Apr. 10, 2012, 16 pages.
U.S. Appl. No. 12/495,684, Office Action dated Dec. 2, 2013, 14 pages.
U.S. Appl. No. 12/495,718, Amendment and Response filed Feb. 10, 2012, 13 pages.
U.S. Appl. No. 12/495,718, Amendment and Response filed May 22, 2012, 12 pages.
U.S. Appl. No. 12/495,718, Amendment and Response filed Sep. 24, 2013, 12 pages.
U.S. Appl. No. 12/495,718, Amendment and Response filed Mar. 31, 2014, 12 pages.
U.S. Appl. No. 12/495,718, Amendment and Response filed Dec. 30, 2014, 15 pages.
U.S. Appl. No. 12/495,718, Notice of Allowance dated Jan. 26, 2015, 12 pages.
U.S. Appl. No. 12/495,718, Office Action dated Nov. 15, 2011, 10 pages.
U.S. Appl. No. 12/495,718, Office Action dated Feb. 27, 2012, 11 pages.
U.S. Appl. No. 12/495,718, Office Action dated Jun. 28, 2013, 10 pages.
U.S. Appl. No. 12/495,718, Office Action dated Dec. 30, 2013, 11 pages.
U.S. Appl. No. 12/495,718, Office Action dated Sep. 30, 2014, 10 pages.
U.S. Appl. No. 12/495,748, Amendment and Response filed Feb. 7, 2012, 13 pages.
U.S. Appl. No. 12/495,748, Amendment and Response filed Jul. 11, 2012, 12 pages.
U.S. Appl. No. 12/495,748, Notice of Allowance dated Jul. 18, 2012, 6 pages.
U.S. Appl. No. 12/495,748, Office Action dated Nov. 8, 2011, 8 pages.
U.S. Appl. No. 12/495,748, Office Action dated Apr. 17, 2012, 5 pages.
U.S. Appl. No. 12/495,756, Amendment and Response filed May 2, 2011, 12 pages.
U.S. Appl. No. 12/495,756, Notice of Allowance dated Jun. 15, 2011, 9 pages.
U.S. Appl. No. 12/495,756, Office Action dated Feb. 2, 2011, 15 pages.
U.S. Appl. No. 14/144,199, Advisory Action dated Dec. 30, 2016, 5 pages.
U.S. Appl. No. 14/144,199, Amendment and Response filed Jun. 10, 2016, 12 pages.
U.S. Appl. No. 14/144,199, Amendment and Response filed Nov. 16, 2016, 9 pages.
U.S. Appl. No. 14/144,199, Amendment and Response filed Jan. 17, 2017, 13 pages.
U.S. Appl. No. 14/144,199, Office Action dated Mar. 10, 2016, 44 pages.
U.S. Appl. No. 14/144,199, Office Action dated Sep. 22, 2016, 14 pages.
U.S. Appl. No. 14/144,199, Office Action dated Apr. 4, 2017, 14 pages.
U.S. Appl. No. 14/149,140, Amendment and Response filed Jun. 24, 2016, 13 pages.
U.S. Appl. No. 14/149,140, Notice of Allowance dated Nov. 18, 2016, 8 pages.
U.S. Appl. No. 14/149,140, Office Action dated Mar. 24, 2016, 18 pages.
U.S. Appl. No. 14/149,140, Office Action dated Oct. 20, 2016, 13 pages.
U.S. Appl. No. 14/547,083, 312 Amendment filed Apr. 12, 2017, 3 pages.
U.S. Appl. No. 14/547,083, Amendment and Response filed Jul. 20, 2016, 11 pages.
U.S. Appl. No. 14/547,083, Amendment and Response filed Dec. 22, 2016, 12 pages.
U.S. Appl. No. 14/547,083, Notice of Allowance dated Jan. 13, 2017, 9 pages.
U.S. Appl. No. 14/547,083, Office Action dated Apr. 20, 2016, 11 pages.
U.S. Appl. No. 14/547,083, Office Action dated Nov. 3, 2016, 13 pages.
U.S. Appl. No. 14/547,083, Response to 312 Amendment dated Apr. 27, 2017, 2 pages.
U.S. Appl. No. 15/250,763, Amendment and Response filed Apr. 13, 2017, 11 pages.
U.S. Appl. No. 15/250,763, Office Action dated Jan. 13, 2017, 16 pages.
U.S. Appl. No. 15/250,763, Office Action dated May 5, 2017, 13 pages.
Using Adobe Acrobat, Apr. 9, 2004, 17 pages.
Warner, "Dreamweaver CS3 for Dummies" May 7, 2007, 12 pages.
Wikipedia, "File Manager", https://en.wikipedia.org/wiki/File_manager, 7 pages.
World Poker Tour Deals Twelve Million Hands of WPT Texas Hold'Em and Receives Industry Accolades, Feb. 26, 2008, 4 pages, wireless.ign.com/articles/854/854954p1.htm.
WPT Mobile; World Poker Tour; wptmobile.handson.com/wpt_texas_hold_em_2.pho?performcheck=2, 2008, 1 page.
Response to Non-Final Office Action filed on Dec. 21, 2018, for U.S. Appl. No. 15/250,763 , dated Sep. 20, 2018, 21 pages.
Corrected Notice of Allowability Received for U.S. Appl. No. 14/144,199 dated Nov. 2, 2018, 3 pages.
Corrected Notice of Allowability received for U.S. Appl. No. 14/144,199, dated Nov. 19, 2018, 3 pages.
Decision on Pre Appeal Brief received for U.S. Appl. No. 12/347,747, dated Nov. 27, 2018, 2 pages.
Pre Appeal Brief Filed on Oct. 12, 2018, for U.S. Appl. No. 12/347,747, 5 pages.
Response to Non-Final Office Action filed on Dec. 14, 2018, for U.S. Appl. No. 15/452,474 , dated Nov. 6, 2018, 10 pages.
Non-Final Office Action received for U.S. Appl. No. 15/452,474, dated Nov. 6, 2018, 11 pages.
Response to Final Office Action filed on Oct. 18, 2018, for U.S. Appl. No. 15/452,474, dated Jul. 16, 2018, 16 pages.
European Summons in Application 09774560.8, dated May 3, 2017, 16 pages.

(56) References Cited

OTHER PUBLICATIONS

"Free Word 2003 Tutorial at GCFLearnFree", Jan. 1, 2003, http://www.gcflearnfree.org/word2003/insterting-hyperlinnks/1, 2 pages.

Taylor, "Crystal Reports 10: Adding a Hyperlink to a Report" In Crystal reports 10 for Dummies, Jun. 1, 2004, 6 pages.

U.S. Appl. No. 14/144,199, Amendment and Response filed Aug. 4, 2017, 11 pages.

U.S. Appl. No. 14/722,030, Office Action dated Jun. 19, 2017, 11 pages.

U.S. Appl. No. 15/250,763, Amendment and Response filed Aug. 7, 2017, 11 pages.

U.S. Appl. No. 12/347,747, Advisory Action dated May 24, 2017, 3 pages.

Final Office Action received for U.S. Appl. No. 15/250,763, dated Apr. 12, 2019, 13 pages.

Roxio, "Photoshow", Retrieved from the Internet URL: <http://www.photoshow.com/home/start>, Accessed on May 21, 2019, 1 page.

Applicant Initiated Interview Summary received for U.S. Appl. No. 12/347,747, dated Dec. 20, 2019, 3 pages.

Applicant Initiated Interview Summary received for U.S. Appl. No. 12/347,747, dated Nov. 8, 2016, 3 pages.

Non-Final Office Action received for U.S. Appl. No. 12/347,747, dated Oct. 4, 2019, 14 pages.

Notice of Allowance received for U.S. Appl. No. 14/722,030, dated Jan. 23, 2019, 7 pages.

Response to Final Office Action filed on Mar. 25, 2019 for U.S. Appl. No. 12/347,747, dated Jul. 12, 2018, 10 pages.

Response to Non-Final Office Action filed Dec. 27, 2019 for U.S. Appl. No. 12/347,747, dated Oct. 4, 2019, 11 pages.

Examiner Interview Summary received dated Dec. 20, 2019 for U.S. Appl. No. 12/347,747, 3 pages.

Non-Final Office Action received on Mar. 20, 2020 for U.S. Appl. No. 16/046,547, 8 pages.

Final Office Action Received for U.S. Appl. No. 12/347,747, dated Mar. 31, 2020, 12 pages.

\* cited by examiner

SYSTEM AND METHODS FOR MULTIMEDIA "HOT SPOT" ENABLEMENT

CROSS-REFERENCE TO RELATED APPLICATIONS

This application is a continuation application and claims priority to U.S. patent application Ser. No. 12/347,638, filed Dec. 31, 2008, entitled "Systems and Methods for Multimedia "Hot Spot" Enablement," which claims priority and the benefit of U.S. Provisional Patent Application No. 61/078,288, filed Jul. 3, 2008, entitled, "Multi-Media Online Presentation System and Method," each of which is incorporated herein by reference.

BACKGROUND

Field of Invention

The present invention generally relates to network-based multimedia presentations and more particularly to a system and methods for multimedia "hot spot" enablement.

Related Art

Multimedia is media and content that utilizes a combination of different content forms. The term is used in contrast to media that only utilizes traditional forms of printed or hand-produced text and still graphics. In general, multimedia includes a combination of text, audio, still images, animation, video, and interactivity content forms. Multimedia is usually recorded and played, displayed, or accessed by information content processing devices, such as computerized and electronic devices. Multimedia finds its application in various areas including, but not limited to, social marketing, advertisement, art, education, entertainment, engineering, medicine, mathematics, business, scientific research and spatial temporal applications.

A variety of online websites are presently available to enable the creation and presentation including the publication of some form of multimedia. For example, MixerCast enables a user to build a social marketing application from scratch. Scraplog enables a user to combine photos, videos, audio and text to create multimedia scrapbooks. Smilebox facilitates "creative messaging" that draws elements from photo services, scrapbooking, and ecards.

Each website will typically provide one or more online tools for the creation and customization of the multimedia. Such online tools and/or desktop tools such as Photoshop, Illustrator, etc., allow the user to collect, edit, create, and publish or distribute the multimedia. In this regard, various style presentations may be utilized, photos may be resized and text may be added, video may be inserted, and/or links to other sites or presentations may be provided. Despite providing some level of customization, the complexity of multimedia authoring tools currently available limit the self-expression and creativity of the non-professional user when creating multimedia presentations. Accordingly, there exists a need for a relatively more robust easy to use multimedia creation tool including a system and method for multimedia "hot spot" enablement.

SUMMARY

For purposes of summarizing the disclosure, exemplary embodiments of systems and methods for multimedia "hot spot" enablement have been described herein.

In one embodiment, a method for creating a multimedia presentation element, comprises selecting a presentation element icon; adding information to a presentation element box defined by a presentation boundary within a first multimedia element of the multi-media presentation having a plurality of multimedia elements, the presentation element boundary resulting from the selection of the presentation element icon; and associating the presentation element box with the first multimedia element such that the presentation element box remains associated to the first multimedia element during navigation from different multimedia elements of the plurality of multimedia elements.

In another embodiment, a system for creating a multimedia presentation element, comprises a storage device; a processing element having a processing program and access to the storage device; a processing-readable medium having executable instructions thereon to direct the processing system when used by the processing element to select a presentation element icon; add information to a presentation element box defined by a presentation boundary within a first multimedia element of the multi-media presentation having a plurality of multimedia elements, the presentation element boundary resulting from the selection of the presentation element icon; and associate the presentation element box with the first multimedia element such that the presentation element box remains associated to the first multimedia element during navigation from different multimedia elements of the plurality of multimedia elements.

In still another embodiment, a computer-readable medium having computer executable instructions for performing a method comprises selecting a presentation element icon; adding information to a presentation element box defined by a presentation boundary within a first multimedia element of the multi-media presentation having a plurality of multimedia elements, the presentation element boundary resulting from the selection of the presentation element icon; and associating the presentation element box with the first multimedia element such that the presentation element box remains associated to the first multimedia element during navigation from different multimedia elements of the plurality of multimedia elements.

These and other features and advantages of the present invention will be more readily apparent from the detailed description of the embodiments set forth below taken in conjunction with the accompanying drawings.

Figure 1:
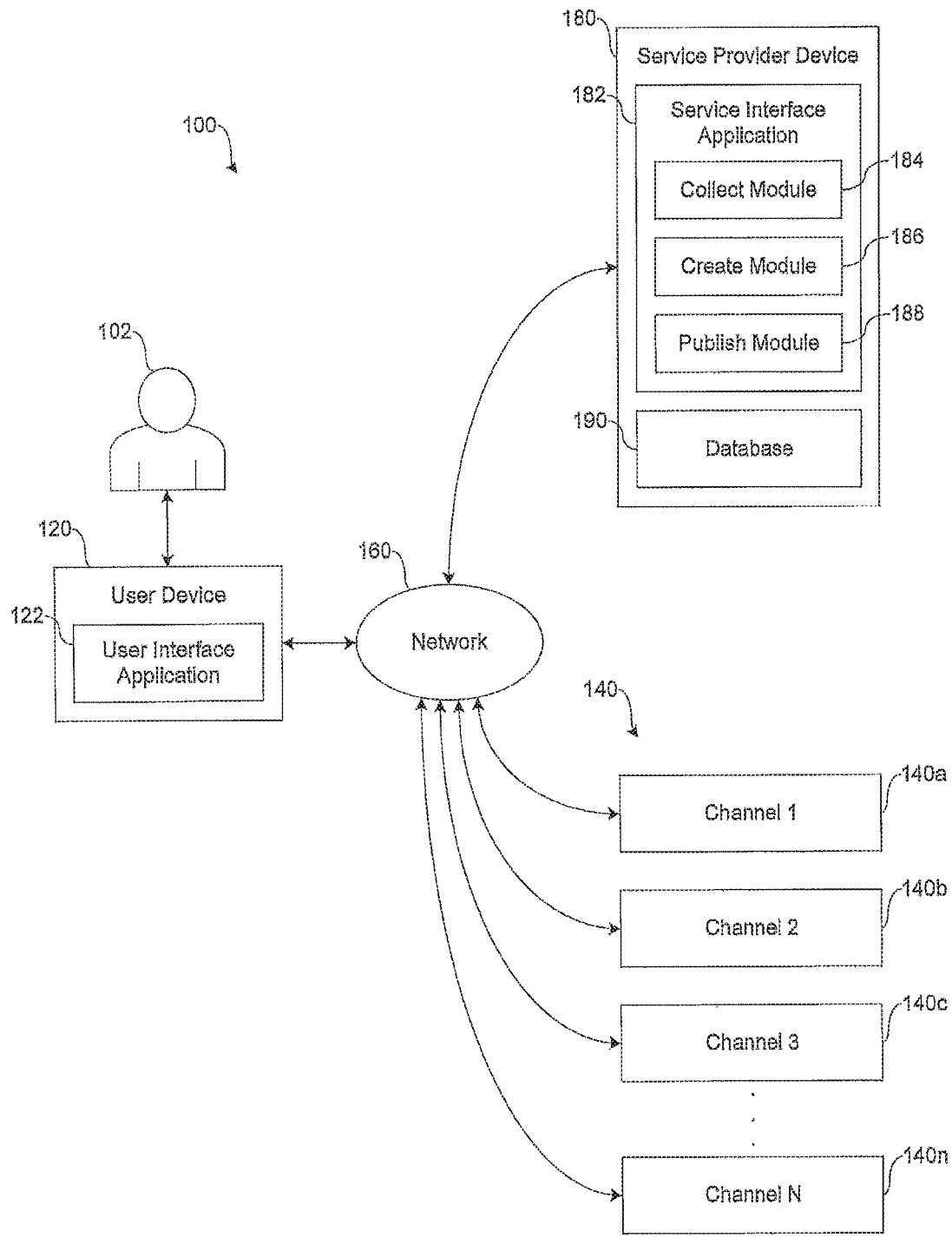
FIG. 1 shows a block diagram of a system configured to facilitate the creation and publishing and/or sharing of multimedia presentations over a network.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure related to systems and methods for multimedia "hot spot" enablement within a multimedia presentation. As indicated above, such multimedia presentations may find application in various areas including, but not limited to, social marketing, advertisement, art, education, entertainment, engineering, medicine, mathematics, business, scientific research and spatial temporal applications.

In one embodiment a system and method provides for a robust end-to-end digital media creation architecture that enables a user to create rich multi-media presentations and clips online with real-time editing and authoring, and then share or publish the media online. As shown in FIG. 1, the system 100 includes at least one client device 120 (e.g., network computing device), one or more multi-media distribution channels 140 (e.g., network server devices), and at least one service provider device 180 (e.g., network server device) in communication over the network 160.

In one embodiment, the network 160 may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the at least one client device 120, the multi-media distribution channels 140, and the at least one service provider device 180 may be associated with a particular link (e.g., a link, such as a URL (Uniform Resource Locator) to an IP (Internet Protocol) address).

In various embodiments, the at least one client device 120 may be implemented using any appropriate combination of hardware and/or software configured for wired and/or wireless communication over the network 160. The client device 120 may be implemented as a personal computing device (e.g., a personal computer (PC)) in communication with the network 160, such as the Internet. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or customer device without departing from the scope of the present disclosure.

In one embodiment, the client device 120 includes a user interface application 122 that may be utilized by a user 102 to conduct information transactions with the distribution channels 140 and the service provider server 180 over the network 160. For example, the user interface application 122 may be implemented as a multi-media presentation application to collect, create and publish information via the network 160. In various implementations, multi-media presentations may be published to and/or shared with one or more of the multi-media channels 140 via the user interface application 122 over the network 160.

In one implementation, the user interface application 122 comprises a software program, such as a graphical user interface (GUI), executable by a processor that is configured to interface and communicate with the multi-media channels 140 and the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, each member of the user group 102 is able to access multi-media websites via the one or more multi-media channels 140 to view, collect and publish multi-media presentations over the network 160.

In various embodiments, the client device 120 may include other applications as may be desired in one or more implementations to provide additional features available to the user 102. In one example, such other applications may include security applications for implementing client-side security features, programmatic client applications for interfacing with appropriate application programming interfaces (APIs) over the network 160 or various other types of generally known programs and/or applications. In other examples, these other applications may interface with the user interface application 122 for improved efficiency and convenience. For example, files, data, and/or various types of information may be imported from multi-media software directly into the user interface application 122 for ease of access to multi-media files (e.g., audio, video, pictures, clip-art, etc.).

The client device 120 may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider server 180 during publishing and/or sharing of a multi-media presentation.

In one embodiment, the multi-media distribution channels 140 may be maintained by one or more resource providers and/or entities (e.g., social networking sites, resource information sites, management sites, merchant sites, etc.) in communication with the network 160. In this regard, the service provider server 180, discussed below, may maintain or provide access to the one or more of the multi-media distribution channels. The multi-media distribution channels 140 may be implemented using any appropriate combination of hardware and/or software configured for wired and/or wireless communication over the network 160. In one implementation, the multi-media distribution channels 140 may be implemented as a network computing device (e.g., a network server) in wired and/or wireless communication with the network 160.

In one embodiment, the service provider server 180 may be maintained by an online transaction processing provider and/or entity in communication with the network 160. As such, the service provider server 180 may be implemented using any appropriate combination of hardware and/or software configured for wired and/or wireless communication over the network 160. In one implementation, the service provider server 180 may be implemented as a network computing device (e.g., a network server) in wired and/or wireless communication with the network 160.

As further shown in FIG. 1, the service provider server 180 includes a service interface application 182, which may be adapted to interact with the client device 120 to facilitate the collection of media, as well as the creation including editing and the publishing and/or sharing of multimedia presentations over a network. In one example, the service provider server 180 may be provided and implemented by PayPal, Inc. of San Jose, Calif., USA.

The service application 182, in one embodiment, utilizes a collect module 184, a create module 186, and a publish module 188 running on a standard web browser to collect information, create presentations, and publish presentations, respectively. As described in greater detail herein, the modules 184, 186, 188 enable users, such as the user 102, to collect diverse types of audio and visual media, create rich multi-media presentations with real-time editing and authoring using media software, such as Flash, and then share and/or publish the rich multi-media presentations with other users via the network 160. In one example, the collect, create, and publish modules 184, 186, 188 may be implemented within a standard web browser for interfacing with the user 102.

In one implementation, the user 102 is able to share multi-media presentations with other users via the media channels 140 and/or embed multi-media presentations directly in webpages of other users. For example, the user 102 may provide a unique URL link for the multi-media presentation to other users. In another example, the user 102 may directly email multi-media presentations to multiple recipients and include a message with the email. In still another example, the user 102 may provide the source HTML (i.e., HyperText Markup Language) code to other users and/or embed the source HTML code directly into another user's webpage. Still other examples include the ability to publish multi-media presentations on a website to sell a particular item or service for purchase. For items and/or services, a media rich presentation may help users market and sell items and/or services, which may be valuable for high-end or high-priced items and/or services. Social and/or dating sites may utilize these multi-media presentations to provide online users with a way to better present themselves to other online users. In various implementations, some type of webpage may be presented in a more dynamic manner by utilizing Rich Site Summary (RSS) feeds, since, for example, a particular user's presentation may be continually changing with new media.

In various embodiments, the service provider server 180 may be configured to maintain, store and/or archive multi-media presentations in a database 190, each of which may include information related to one or more users, such as the user 102, and one or more multimedia channels, such as multimedia distributions channels 140. In various examples, the multimedia presentations may include attributes stored as part thereof, and the attributes may be passed to the service provider server 180 as part of a creating, publishing and/or sharing the multi-media presentations.

Referring to FIG. 1, in one embodiment, the collect module 184 enables the user 102 to collect audio, photographic images, video, and music media from various sources, such as a PC, RSS feeds, websites, and any other online source, via a user interface, such as the user interface application 122. In various implementations, the user interface application 122 comprises multiple tabs and/or links for the various sources. Key words can be selected to search photos in Flickr or videos in YouTube. For example, typing in "flamingo" and selecting Flickr results in pictures of flamingos or photos matching the word "flamingo" from Flickr being presented on the user's GUI or media page. The pictures can be edited into stacks if desired. For videos, a desired video can be placed onto the user's media page by typing in the corresponding URL in YouTube. The system can then display the complete as well as a series of shorter video clips. The whole video or selected shorter clips, as well as the photos can then be dragged and dropped into a storybook section to create a presentation from the media collected.

Once collected, the media may be saved and categorized in the database 190 and edited on the system site via the service provider'server 180. Editing may include one or more of sizing, rotating, overlying, moving and stacking various media backward and forward with an overlay or stack. Video may be broken up automatically by the service provider server 180 into smaller segments. Selected video segments may be combined and/or used as desired. Selected media may be placed on a virtual storyboard, such as a clipboard, on the same screen as the collection of media. Media may be edited either in the collection or in the storyboard. Placing desired media on the storyboard or clip board may be accomplished by dragging and dropping. In one example, the collect module 184 provides selected media on a storyboard. In another example, the collect module 184 provides media on a user's media page (i.e., not placed on the storyboard). In still another example, uploading media may be delayed until editing is completed.

In one embodiment, the create module 186 enables the user 102 to place selected media onto a storyboard. The service provider server 180 may automatically suggest a story idea to launch the creative process, or the user 102 may select a specific style or presentation tool. In one implementation, media from the storyboard may be dragged and dropped onto the presentation. Within the presentation, there may be multiple styles, such as a picture frame, a television, a billboard, etc. Media may be placed within the viewing window of each type of style. Once in the presentation, the media may be edited. For example, the media may be rotated, sized, cut-out (e.g., by selecting the boundaries of an image, such as with clicks to designate points along the boundary, enabling as coarse or fine a resolution as desired), moved forward or backward in relation to adjacent media, slide multiple images to add or remove spaces within the presentation, and adding a hotspot (e.g., selecting an area of the image for additional information, such as adding a link, video, text, etc.). Other editing features may include adding audio to the background, adding text, and/or distorting images. In one aspect, the editing may be achieved in real-time so that the user 102 may quickly and easily see the results and change them as needed.

Various tools or modules may be combined, used, and/or modified to provide the user with different initial choices regarding the type of presentation and features desired for creating the multimedia presentation. For example, as described blow, the user may access a collage tool or application to create dynamic interactive panoramas with "hot spots" and layouts of photos, video, text and audio on an infinite stage. In one variation of collage the stage extends infinitely to the right, and when viewed there is a natural progression from left to right that can map well to linear narrative, time, or space. In another variation the stage extends infinity downward. Again, this presents a natural mapping to time, space, or narrative. The collage tool introduces a new creation platform for WYSIWYG online multimedia layout and sharing, offering the ability to include direct links and presentations.

The collage presentation may be represented as a document with an infinite number of layers. Each layer has various attributes including position, scale, visual bounds, associated annotations "hotspots" and a target media asset that may also have layer specific properties, such as playback behaviors.

In one embodiment, the publish module 186 enables the user 102 to share, publish and/or distribute the presentation when, for example, the presentation is completed. In one implementation, as described herein, the presentation may be saved in the database 190 of the service provider server 180. Once saved, the user 102 may share, publish and/or distribute presentations to any selected channel, such as one or more of the multi-media channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

The collect, create, and publish modules 184, 186, 188 may be combined, used, and/or modified to provide the user 102 with different initial choices regarding the type of presentation and features desired for creating the multimedia presentation. The choices may be a simple, easy to use tool to quickly build presentations with dynamic content from RSS feeds and online albums. Accordingly, the user 102 may select a presentation style and then link it to the user's media libraries through RSS feeds that maintain an "always on" permalink to the content source.

As indicated above and shown in FIGS. 2A-2G, the user may add "hot spot(s)" to the media piece. A "hot spot" is generally considered as a defined area with a presentation used to bring editorial attention and richer media to the presentation. In this regard, a stand alone "hot spot" module or a 'hot spot' sub-module within the Create module 186 of the multi-media online presentation system described herein may be accessed to create the "hot spot". Such a module or sub-module may be embodied in a computer-readable medium as executable instructions that can be used to direct a processing program when used by a computer system, as described below. As still further indicated above, the "hot spot" module in the creation of the "hot spot" may be considered as an additional layer added to the multi-layer approach of creating an online multi-media presentation.

Figure 2A:
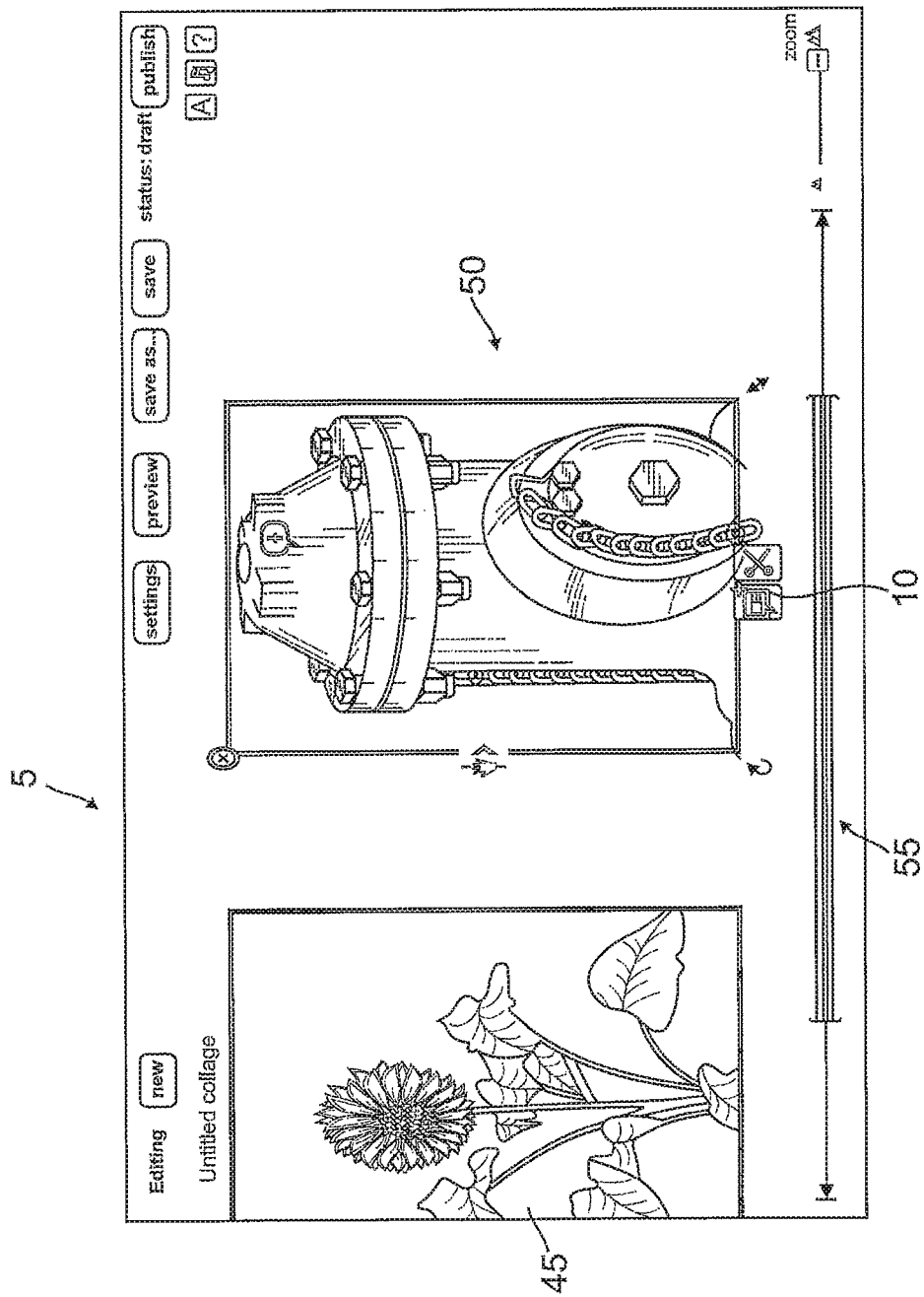
FIGS. 2A-2G show various elements, components, or stages of a "hot spot" as described here in accordance with one embodiment.
Figure 2B:
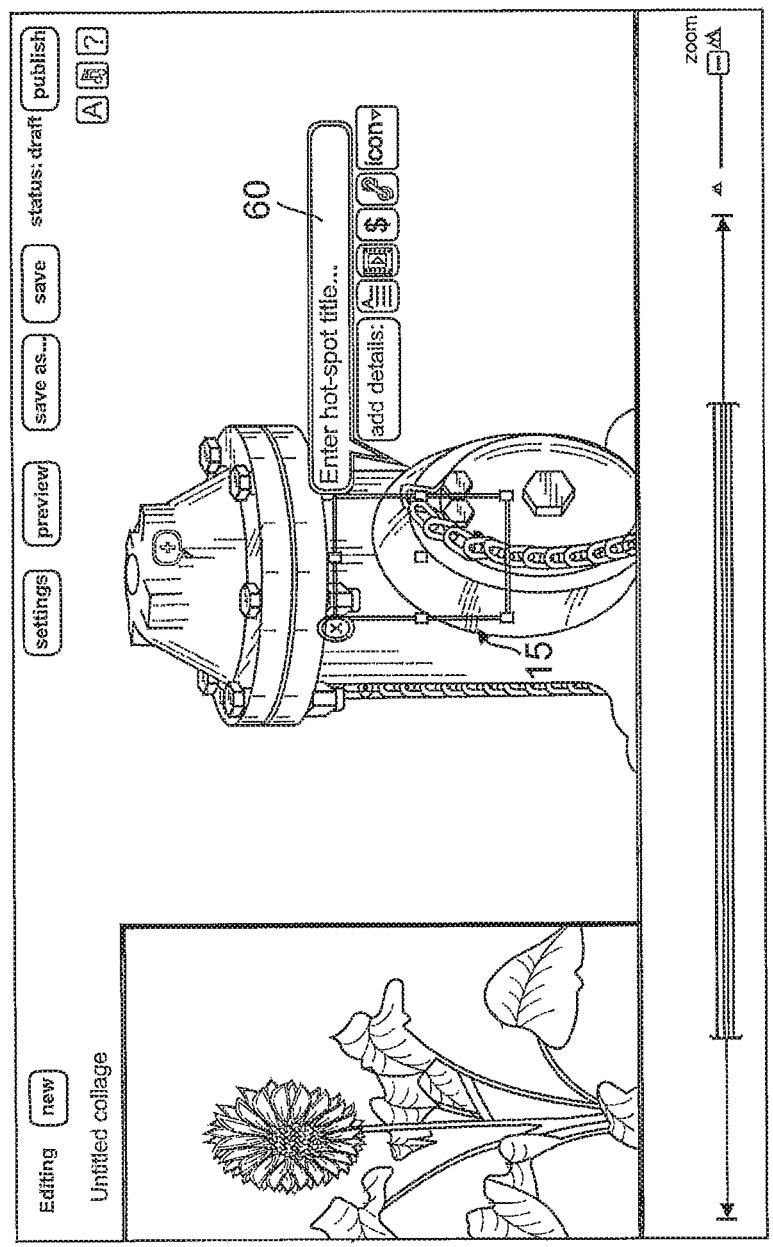
Figure 2C:
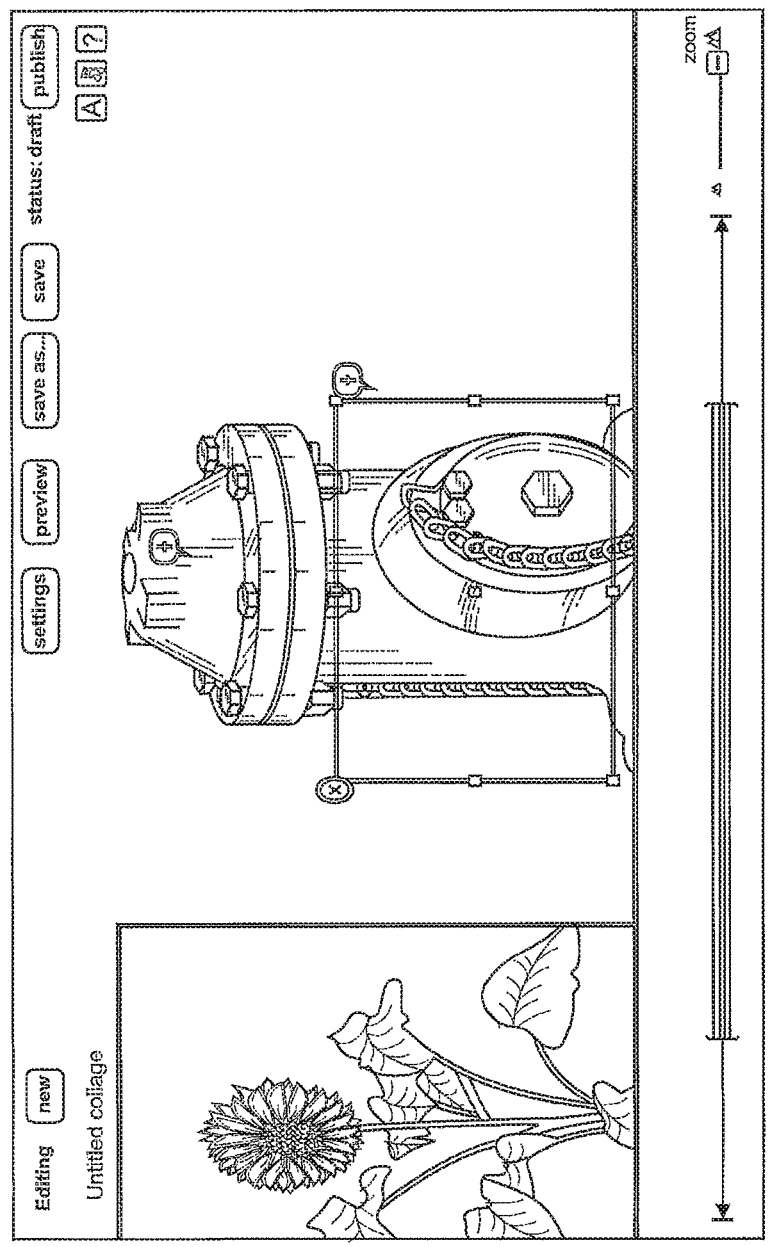
Figure 2D:
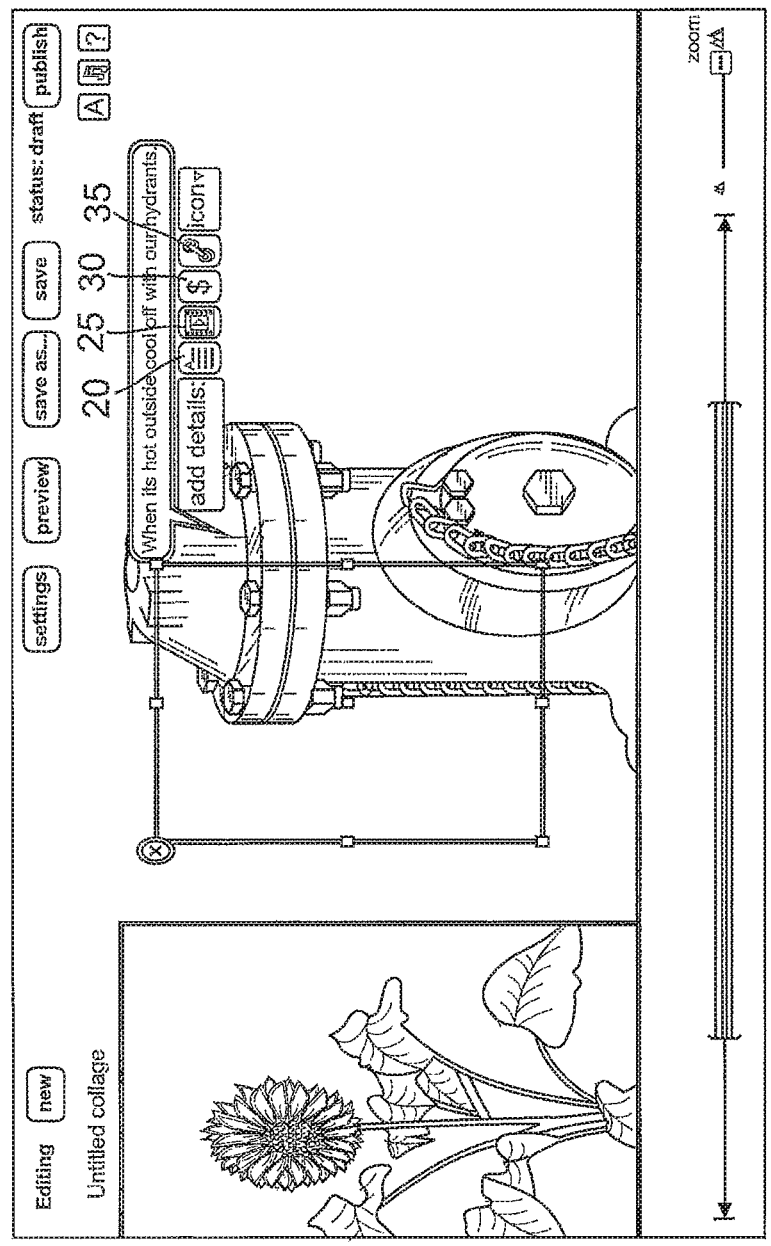
Figure 2E:
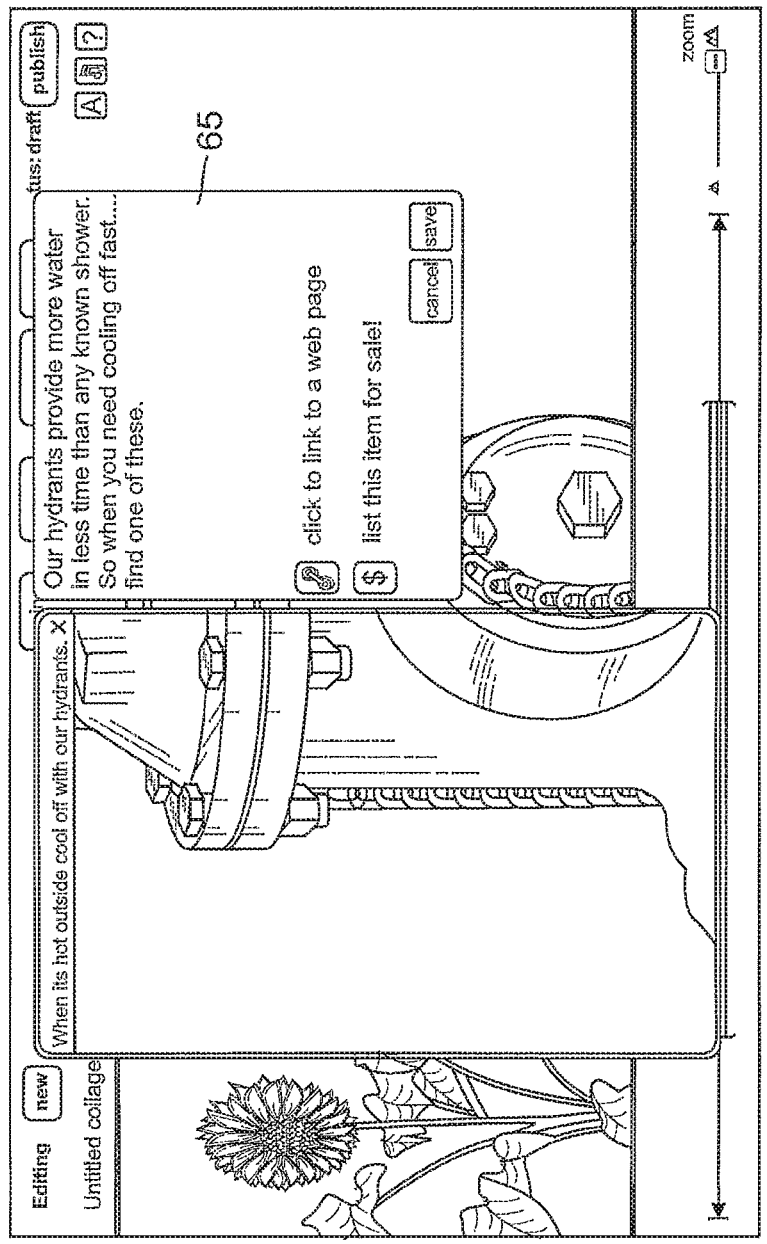

As shown in FIG. 2A, to add a "hotspot", a desired first multimedia element or image (hydrant) is selected as well as a presentation element icon or "hot spot" icon 10 (FIG. 2A). In this regard, in a collage presentation, for example, a plurality of multimedia elements are arranged and presented to allow a viewer to navigate among the different multimedia elements. After selection of the "hot spot" icon the user is then presented with a presentation element boundary or "hot spot" boundary 15 that defines a presentation element area or "hot spot" area (FIG. 2B). The "hot spot" boundary 15 or area defined by the boundary can be positioned and resized anywhere within the multimedia presentation (FIG. 2C). Information may be added to a "hot spot" title to identify the "hot spot" area (FIG. 2D). More detailed information may be added to a "hot spot" box within the "hot spot" area by selecting the add details information icon 20 (FIG. 2E).

Figure 2F:
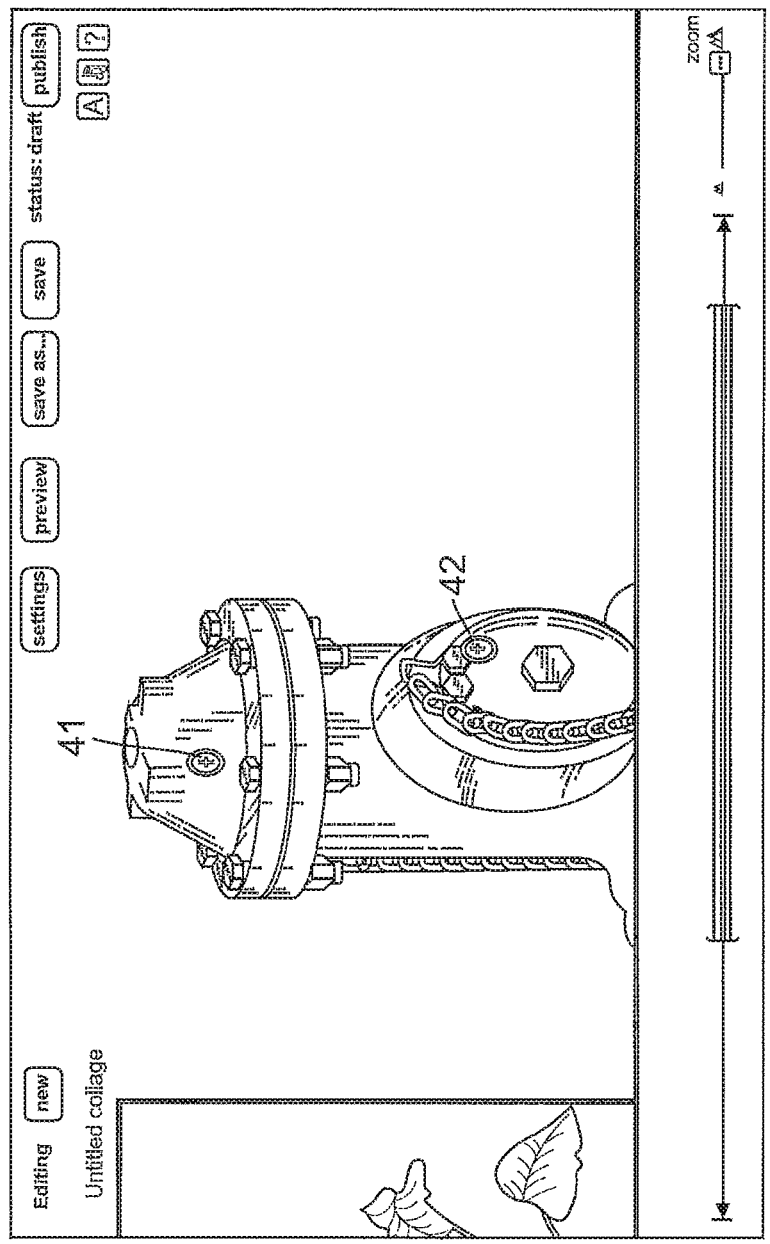
Figure 2G:
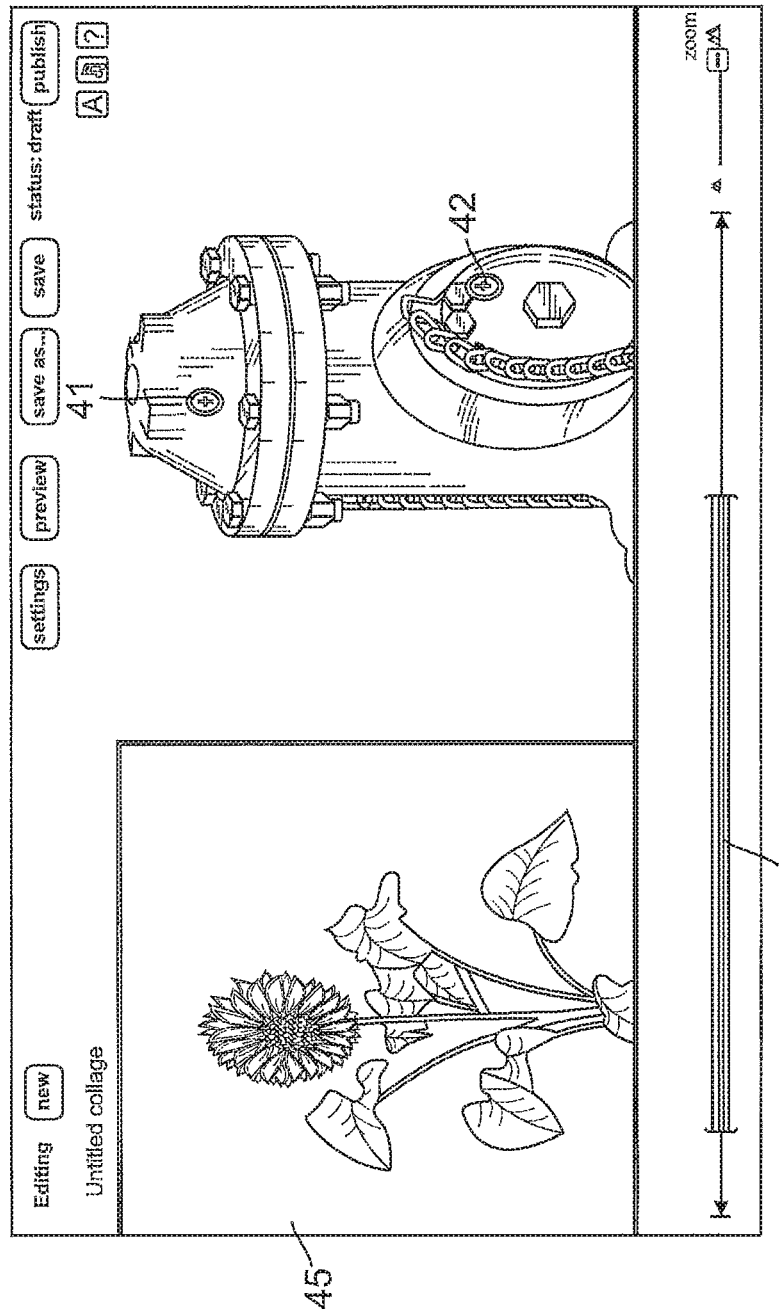

"Hot spots" may be further used to add media details to the "hot spot" area including multimedia (audio and/or video) 25, link to a sale item 30, or even link 35 to an external website or web page as further shown in the add details portion of the "hot spot" (FIG. 2D). The user may utilize one or more "hot spots" within a single presentation (FIG. 2F). In the example shown in FIG. 2F, each "hot spot" is represented by a plus (+) sign. Other symbols may be used to represent or identify the "hot spot" including, but not limited to, a flashing dollar sign ($), question mark (?), etc. Each "hot spot" is associated with the multimedia presentation so that as the presentation is moved, for example, navigated from left-to-right or right-to-left in a linear collage presentation, the "hot spot(s)" moves correspondingly (FIG. 2G). Persons of ordinary skill in the art will understand the other navigation patterns such as up-and-down, diagonal, or circular are intended to support the use of the presentation elements or "hot spots" described herein.

Once created, a "hot spot" may be identified by the title of the "hot spot" as a cursor is moved over a designated "hot spot" icon. Activating the "hot spot" by clicking in the hot spot area may link the user to addition the information or multimedia described above corresponding to the "hot spot" area. For example, if an automobile is used as a media item within the collage storyboard, a "hot spot" may link the user to additional information relating to the automobile such as price, condition, and terms or sale. "Hot spots" may be specific to one part or element of the item. In the automobile example, the user may create a "hot spot" on the tire, which, when opened, may give the viewer access and/or information (text, video, audio) relating to the tire, where to buy the tire, etc. Other "hot spots" may link the user to music, other audio clips, or a separate media piece that was copied and then uploaded into the collage presentation.

Figure 3:
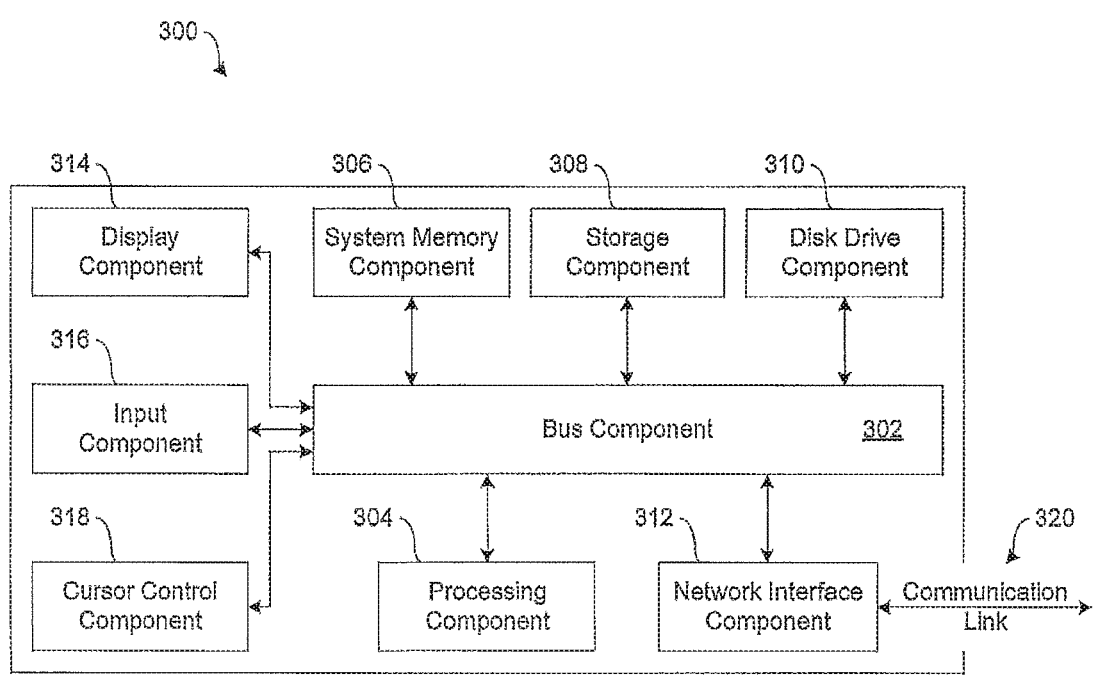
FIG. 3 is a block diagram of a computer system suitable for implementing one or more embodiments of the present disclosure.

FIG. 3 is a block diagram of a computer system 300 suitable for implementing one or more embodiments of the present disclosure, including the user device 120, the one or more distribution channels 140, and the service provider device 180. In various implementations, the client device 140 may comprise a personal computing device capable of communicating with the network 160, such as a personal computer, laptop, cell phone, PDA, etc., the one or more merchant devices 140 may comprise a network computing device, such as a network server, and the service provider device 180 may comprise a network computing device, such as a network server. Hence, it should be appreciated that each of the devices 120, 140, 180 may be implemented as computer system 300 in a manner as follows.

In accordance with various embodiments of the present disclosure, computer system 300, such as a personal computer and/or a network server, includes a bus 302 or other communication mechanism for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., CRT or LCD), input component 316 (e.g., keyboard), and cursor control component 318 (e.g., mouse or trackball). In one implementation, disk drive component 310 may comprise a database having one or more disk drive components.

In accordance with embodiments of the present disclosure, methods described herein are developed as a program language and embodied in a processing of computer-readable medium as executable instructions that can be used to direct a processing program when used by the computer system 300. In this regard, the computer system 300 may perform specific operations by processor 304 executing one or more sequences of one or more instructions contained in system memory component 306. Such instructions may be read into system memory component 306 from a computer readable medium, such as static storage component 308 or disk drive component 310. In other embodiments, hard-wired circuitry may be used in place of or in combination with software instructions to implement the present disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 320 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for creating a multimedia presentation element, comprising:
   receiving a selection of a multimedia element for a multimedia presentation;
   receiving a selection to generate a hotspot that is associated with the multimedia element;
   receiving an input to adjust a boundary of the hotspot, wherein the boundary of the hotspot defines an area that can be activated to display an additional multimedia element that is associated with the multimedia element;
   associating the hotspot with a content source that provides the additional multimedia element, wherein said associating comprises presenting a plurality of selectable icons adjacent the hotspot, each selectable icon being associated with a different content source and using at least one of the selectable icons to associate a content source with the hotspot.

2. The method of claim 1, wherein associating the hotspot with the content source and using at least one of the selectable icons comprises receiving selection of one of an audio and/or video icon for adding audio or video content to the hotspot, or a link to a sale item icon.

3. The method of claim 1, further comprising customizing the hotspot based on received input.

4. The method of claim 3, wherein the received input is received in a menu associated with the hotspot.

5. The method of claim 1, wherein the multimedia element is sharable to enable a plurality of users to provide input for the hotspot.

6. The method of claim 1, wherein the content source is a local storage device.

7. A system, comprising:
   a processor; and
   a memory coupled to the processor and storing instructions that, when executed by the processor, performs a method, comprising:
   presenting a plurality of multimedia elements on a display;
   upon receiving a selection of at least one of the plurality of multimedia elements, providing a menu that enables a hotspot to be associated with the at least one of the plurality of multimedia elements, wherein the menu includes an option for associating the hotspot with an additional multimedia element provided by a content source, wherein said option comprises presenting a plurality of selectable icons adjacent the hotspot, each selectable icon being associated with a different content source, and using at least one of the selectable icons to associate a content source with the hotspot;
   generating a multimedia presentation with the at least one of the plurality of multimedia elements and the hotspot.

8. The system of claim 7, further comprising instructions for receiving input to adjust a boundary associated with the hotspot.

9. The system of claim 7, further comprising instructions for providing the hotspot to a plurality of users to enable the plurality of users to provide edits to the hotspot.

10. The system of claim 7, further comprising instructions for displaying the additional multimedia element with the multimedia presentation when the hotspot is selected.

11. The system of claim 7, further comprising instructions for associating a symbol with the hotspot.

12. The system of claim 7, further comprising instructions for associating a character with the hotspot.

13. A system, comprising:
   a processor; and a memory coupled to the processor and storing instructions that, when executed by the processor, performs a method, comprising:

receiving a selection of a multimedia element for a multimedia presentation;

receiving input for generating a hotspot for the multimedia element, wherein the hotspot is associated with an adjustable boundary that defines an area that can be activated to display an additional multimedia element that is associated with the multimedia element;

associating the hotspot with a content source that provides the additional multimedia element, wherein said associating comprises presenting a plurality of selectable icons adjacent the hotspot, each selectable icon being associated with a different content source, and using at least one of the selectable icons to associate a content source with the hotspot.

14. The system of claim 13, further comprising instructions for providing a representation of the hotspot with the multimedia presentation.

15. The system of claim 13, wherein the instructions for associating the hotspot with the content source and using at least one of the selectable icons comprises receiving selection of one of an audio and/or video icon for adding audio or video to the hotspot, or a link to a sale item icon.

16. The system of claim 13, further comprising instructions for adjusting a size of the adjustable boundary based on received input.

17. The system of claim 13, further comprising instructions for providing the multimedia element and the hotspot to multiple users to enable the multiple users to customize the hotspot.

18. The system of claim 7, wherein the plurality of selectable icons comprise an audio and/or video icon and a link to a sale item icon.

* * * * *